United States Patent [19]

Gary

[11] Patent Number: 5,784,898
[45] Date of Patent: Jul. 28, 1998

[54] PROCESS AND DEVICE FOR THE PREPARATION OF A CRYOGENIC FLUID IN THE HIGH PURITY LIQUID STATE

[75] Inventor: Daniel Gary, Montigny Le Bretonneux, France

[73] Assignee: L'Air Liquide, Societe Anonyme Pour L'Etude et L'Exploitation des Procedes Georges Claude, Paris Cedex, France

[21] Appl. No.: 854,446

[22] Filed: May 14, 1997

[30] Foreign Application Priority Data

Jun. 7, 1996 [FR] France .................. 96 07100

[51] Int. Cl.⁶ .................................................. F25J 1/00
[52] U.S. Cl. .................. 62/636; 62/908; 95/106; 95/138; 95/140
[58] Field of Search .................. 62/908, 636; 95/106, 95/138, 140

[56] References Cited

U.S. PATENT DOCUMENTS 4,150,548  4/1979  Kemp et al. .................. 62/908
4,717,406  1/1988  Giacobbe .................. 62/908
5,425,242  6/1995  Dunne et al. .................. 62/908
5,551,257  9/1996  Jain .................. 62/644

FOREIGN PATENT DOCUMENTS 0 662 595   7/1995  European Pat. Off. .
02 030607   2/1990  Japan .
02 183789   7/1990  Japan .

*Primary Examiner*—Ronald C. Capossela
*Attorney, Agent, or Firm*—Young & Thompson

[57] ABSTRACT

A process and apparatus for the preparation of a cryogenic fluid in the high purity liquid state, such as liquid argon, liquid helium or liquid nitrogen of high purity, substantially free from at least one of the impurities which it contains. The cryogenic fluid in the liquid state to be purified is placed in contact with an adsorbent permitting the adsorption of at least one of the impurities, and the cryogenic fluid is recovered in the high purity liquid state, characterized in that cooling of at least a proportion of the adsorbent is maintained with purified cryogenic fluid in the liquid state during at least a part of the duration of the stoppage stage separating a purification cycle N and a purification cycle N+1, which are successive.

19 Claims, 1 Drawing Sheet

PROCESS AND DEVICE FOR THE PREPARATION OF A CRYOGENIC FLUID IN THE HIGH PURITY LIQUID STATE

FIELD OF THE INVENTION

The present invention relates to the field of the preparation of a cryogenic fluid in the high purity liquid state, in particular liquid helium, liquid argon or liquid nitrogen of high purity, that is to say free from at least one of its impurities, especially of the hydrogen, carbon monoxide or oxygen type.

More particularly, the invention relates to an improvement to the processes and devices for the preparation of a cryogenic fluid in the high purity liquid state, in particular liquid helium, liquid argon or liquid nitrogen of high purity.

BACKGROUND OF THE INVENTION

Liquid or gaseous nitrogen is usually prepared by cryogenic distillation of air, which distillation is performed in a cold box containing one or more distillation columns. The nitrogen thus obtained is of a purity which is sufficient for most of its applications. However, some activity sectors, such as the electronics industry, in particular the manufacture of semiconductors or of other components, or the pharmaceuticals industry, for the purpose of analysis or research, require liquid nitrogen of high purity. Depending on the application, the liquid nitrogen must be appreciably free from at least one of its impurities: hydrogen, oxygen or carbon monoxide.

In other words, the proportion of impurities present in the liquid nitrogen must not exceed a few ppb (parts per thousand million by volume).

Impurities such as hydrogen or carbon monoxide can be removed from the air to be distilled or from the gaseous nitrogen resulting from the cryogenic distillation.

To this end, purification processes have already been proposed, for example, in U.S. Pat. No. 4,869,883, where the impurities are removed by oxidation by reaction with a sufficient quantity of oxygen in the presence of a catalyst, to give water and carbon dioxide, which are subsequently removed by adsorption.

Patent application JP-A-05/079754, for its part, describes a process for removing the carbon dioxide, water and carbon monoxide impurities present in liquid nitrogen.

According to this process liquid nitrogen is drawn off from an air distillation column, conveyed into an absorption column filled with a synthetic zeolite of type A, with a view to the absorption of the impurities, and is then sent back into the distillation column.

Patent application FR No. 93 15958 describes a process allowing liquid nitrogen to be treated directly with a view to being purified and to obtain liquid nitrogen of high purity, that is to say substantially free from at least one of the impurities hydrogen, carbon monoxide and oxygen, where the liquid nitrogen to be purified is placed in contact with an adsorbent permitting the adsorption of at least one of the said impurities; the high purity nitrogen thus produced is subsequently recovered. The adsorber used in this process is chosen from the group consisting of natural and synthetic zeolites and porous metal oxides.

In addition, there are similar processes permitting other cryogenic fluids in the liquid state or cryogenic "liquids" to be purified, such as liquid helium or liquid argon, which can be employed especially in the electronics industry.

However, while these conventional processes make it possible to obtain high purity cryogenic "liquids", such as high purity liquid nitrogen, helium or argon, when they operate continuously, problems arise when they are operated in successive stages or cycles of purification which are separated by longer or shorter stages of stoppage of the purification device, that is to say noncontinuously, which is generally the case on industrial sites.

In fact, for example, liquid nitrogen employed on an industrial site can be produced directly on the said site, as required, and can then be used immediately or else stored with a view to a subsequent use, or alternately may be produced off-site and then conveyed onto the site of use, for example by means of a lorry.

However, the removal of the impurities from nitrogen is very rarely performed continuously; this purification generally takes place in successive purification stages or cycles, which can be more or less separated in time.

To give a nonlimiting example, one can mention the case of the production of nitrogen off-site and then its conveying onto the site by means of a lorry. The liquid nitrogen unloaded from the lorry is first of all transferred towards a device permitting the removal of the impurities present in the said liquid nitrogen to be purified; such a device is commonly called a reactor. The purification of the liquid nitrogen therein is performed by contact with an adsorbent, which selectively traps the impurities in the nitrogen. The high purity nitrogen thus obtained is next conveyed towards its place of use or, more generally, towards a place of storage until subsequent use. The purification stage lasts therefore only while the lorry is being unloaded, (that is to say for one to several hours) and ends when the unloading has been performed.

A new purification stage will therefore take place only when the next lorry is being unloaded, it being possible for this to be more or less distant in time. Now, it has been observed that when the duration of the stoppage stage between two successive purification stages or cycles is extended in time, a migration of the front of the contaminants trapped by the adsorbent present in the reactor generally takes place, the said migration being due to a reheating of the adsorber, following heat inputs into the reactor.

In other words, the longer the duration of the stoppage stage between two successive purification stages N and N+1 becomes in time, the greater the quantity of contaminants encountered again downstream of the reactor. Such a migration of the contaminant front between two successive purification stages is therefore detrimental for obtaining and conserving nitrogen of high purity. In fact, the liquid nitrogen purified from its contaminants, in particular carbon monoxide and oxygen, during a purification stage N+1 will become contaminated by the contaminants extracted during the preceding purification stages, namely N, N−1, and so on.

It follows that the liquid nitrogen thus obtained, which contains impurities released again, cannot be employed in applications which require high purity nitrogen.

SUMMARY OF THE INVENTION

The aim of the present invention is therefore to propose a process and a device for the preparation of a cryogenic fluid in the high purity liquid state, substantially free from at least one of its impurities, such as liquid nitrogen free from one or more of its impurities, hydrogen, carbon monoxide and oxygen, not exhibiting the disadvantages of the abovementioned prior art. In particular, the aim of the invention is to provide a process and a device which make it possible to eliminate or to minimize a migration of the front of the contaminants trapped by the adsorbent of the reactor, during the longer or shorter stages of stoppage separating the various successive purification cycles, which are linked, for example, with the successive unloading of lorries.

Another objective of the invention is to provide a process and a device which are reliable with time, that is to say which make it possible, on the one hand, to avoid or to minimize the migration of the contaminant front when the successive stages of purification are separated by stages of stoppage for considerable periods, for example periods which can be up to one or several weeks, and which, on the other hand, make it possible to obtain a cryogenic fluid in the high purity liquid state, in particular high purity liquid helium, nitrogen or argon, even after a large number of successive purification stages and/or after treatment of large quantities of cryogenic fluid (for example several hundred tons).

The process and the device according to the invention are also economically advantageous because they do not require large investments when compared with the conventional hardware, while permitting an efficacious removal of the contaminants.

The invention therefore consists of a process for the preparation of a cryogenic fluid in the high purity liquid state, substantially free of at least one of the impurities which it contains, in which the cryogenic fluid in the liquid state to be purified is placed in contact with an adsorbent permitting the adsorption of at least one of the impurities and the cryogenic fluid is recovered in the high purity liquid state, characterized in that cooling of at least a proportion of the adsorbent is maintained by means of the cryogenic fluid in the purified liquid state, for at least a part of the period of the stoppage stage separating a purification cycle N and a purification cycle N+1 which are successive.

The cooling of at least a portion of the adsorbent is preferably carried out by direct contact with the cryogenic fluid in the high quality liquid state.

The adsorbent is preferably cooled by immersion in the cryogenic fluid in the high purity liquid state.

The cooling of the adsorbent is advantageously maintained substantially throughout the period of the stoppage stage separating a purification cycle N and a purification cycle N+1 which are successive.

The adsorbent is preferably chosen from the group consisting of natural and synthetic zeolites, optionally exchanged, and porous metal oxides.

The zeolite is advantageously a mordenite or a synthetic zeolite chosen from the group made up of zeolite A, zeolite X and zeolite Y.

The zeolite is preferably a zeolite exchanged with at least one metal ion chosen from the group made up of lithium, calcium, barium, strontium, zinc, iron, silver and copper.

The zeolite is also preferably exchanged with a copper or silver ion.

According to a preferred embodiment of the invention the zeolite is a zeolite 5A exchanged with a copper or silver ion.

According to another embodiment of the invention the porous metal oxide includes at least one oxide of a transition metal.

The porous metal oxide preferably includes a mixed copper manganese oxide such as a Hopcalite.

The cryogenic fluid in the liquid state is preferably chosen from the group made up of liquid helium, liquid argon and liquid nitrogen.

The liquid nitrogen is preferably purified of at least one of its impurities, hydrogen, carbon monoxide and oxygen.

In order to obtain a removal of all the impurities which can be present in the cryogenic fluid in the liquid state, in particular in liquid nitrogen, it is possible to combine zeolite and porous metal oxide in two beds placed in series. Thus, a first bed will be obtained including Hopcalite permitting, for example, a selective removal of oxygen and carbon monoxide, and a second bed including, for example, an exchanged zeolite, permitting the removal of the residual carbon monoxide and of hydrogen.

From an industrial viewpoint it is advantageous to employ an adsorbent of the Hopcalite type because it allows carbon monoxide and oxygen to be purified simultaneously to a very low level (lower than one ppb).

The invention also relates to a device for implementing the process according to the invention, including at least one reactor containing at least one adsorbent permitting the removal of at least one of the impurities present in the cryogenic fluid in the liquid state to be purified, and connected by an upstream conduit to a source of cryogenic fluid in the liquid state to be purified and by a downstream conduit to at least one storage tank for cryogenic fluid in the high purity liquid state, characterized in that it includes at least one conduit for keeping cold, arranged for supplying a flow of cryogenic liquid in the high purity liquid state, to cool at least a portion of the adsorbent during at least a portion of the time stage separating a purification cycle N and a purification cycle N+1 which are successive, the cryogenic fluid in the high purity liquid state originating from at least one source of cryogenic fluid in the high purity liquid state.

The conduit for keeping cold is preferably connected by at least one of its upstream or downstream ends to at least one upstream or downstream portion of the downstream conduit.

According to another "model" of the invention the conduit for keeping cold is connected by at least one of its upstream or downstream ends to at least one source of cryogenic fluid in the high purity liquid state and/or to at least one reactor.

The source of cryogenic fluid in the high purity liquid state is preferably at least one storage tank.

Advantageously, at least one mechanical filter is fitted in the downstream conduit between the upstream and downstream ends of the conduit for keeping cold.

BRIEF DESCRIPTION OF THE DRAWINGS

The invention will now be described, without any limitation being implied, in greater detail, with reference to the appended FIG. 1, which shows a device for the preparation of high purity liquid nitrogen substantially free from at least one of its impurities hydrogen, carbon monoxide and oxygen, in accordance with the invention.

DETAILED DESCRIPTION OF THE INVENTION

Figure 1:
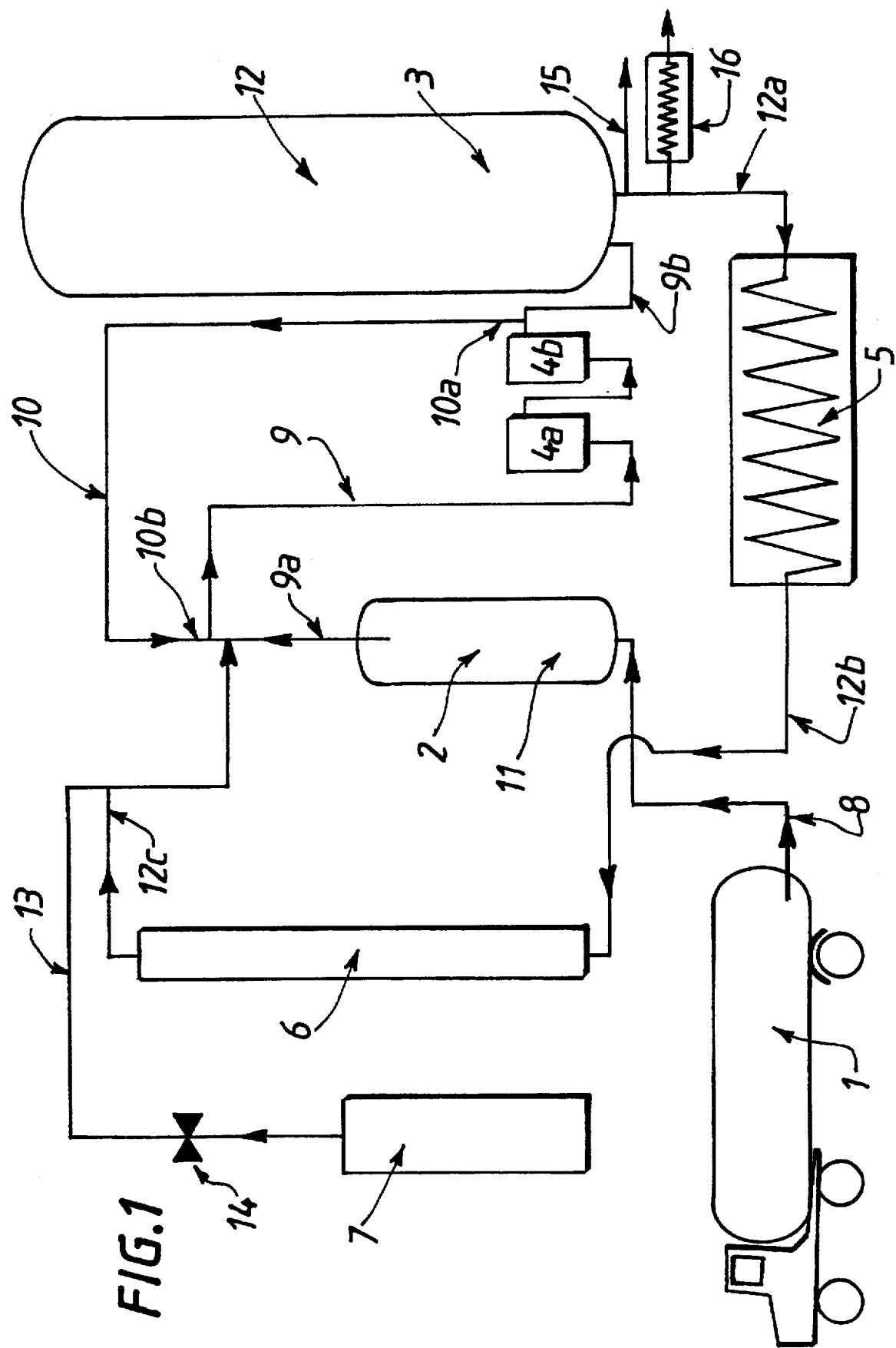

In FIG. 1 a reactor 2 containing an adsorbent 11 is connected, on the one hand, by means of an upstream conduit 8 to a source 1 of a cryogenic fluid in the liquid state, in this case liquid nitrogen, to be purified and, on the other hand, to a storage tank 3 of high purity liquid nitrogen 12 through the intermediacy of a downstream conduit 9; a battery of two filters 4a and 4b being placed between the reactor 2 and the storage tank 3.

References 15 and 16 denote, respectively, the user outlets for high purity liquid or gaseous nitrogen.

Before proceeding to a purification cycle, the part of the equipment which has been left warm between two purification stages, that is to say during the stoppage stage of the device, is purged and precooled, namely especially some parts of pipelines 8 and 9 and the filter battery 4a and 4b; this purge and cooling are performed by operating appropriate valves. Next, after connection of the source 1 of liquid nitrogen to be purified to the upstream conduit 8, the nitrogen to be purified is conveyed from the source 1 to the reactor 2 via the conduit 8. The purification is performed in the reactor 2 by adsorption of the contaminants of the liquid nitrogen to be purified onto the adsorbent 11. The high purity liquid nitrogen obtained after adsorption of the contaminants is conveyed by the conduit 9, including an upstream portion 9a and a downstream portion 9b, through the battery of mechanical filters 4a and 4b, to the storage tank 3.

Between a purification cycle N and a purification cycle N+1 which is to follow and in order to avoid the migration of the front of contaminants adsorbed onto the adsorbent during the preceding purification cycles (N, N−1, etc.), cooling of the adsorbent 11 is maintained during preferably the whole period of the stoppage stage separating the cycles N and N+1, by means of high purity liquid nitrogen 12 originating from at least one source of high purity nitrogen. Here, the high purity nitrogen stored in the tank 3 is advantageously employed, this nitrogen being conveyed by the conduit for keeping cold 1b, which is thermally insulated and properly, dimensioned. This conduit for keeping cold 10 therefore connects the storage tank 3 for high purity nitrogen 12 to the reactor 2 and enables the reactor to be fed with high purity liquid nitrogen in order to keep the adsorbent cooled by immersion in high purity nitrogen essentially continuously between a cycle N and a cycle N+1 which are successive. More precisely, the upstream portion 10a of the conduit for keeping cold 10 is connected to the downstream portion 9b of the downstream conduit 9, which downstream portion 9b is included between the filters 4a and 4b and the source of high purity nitrogen, in this case the storage tank 3. Similarly, the downstream portion lob of the conduit 10 is connected to the upstream portion 9a of the downstream conduit 9, which upstream portion 9a is included between the filters 4a and 4b and the reactor 2.

By virtue of this device contamination of the high purity nitrogen obtained during a cycle N+1 by contaminants adsorbed during preceding cycles is avoided by eliminating any risk of migration of the adsorption fronts.

In addition, it is found that no loss of free liquid nitrogen need be suffered, insofar as the nitrogen employed for keeping the adsorbent cold will not be sent to the atmosphere but returned towards the storage 3 during a purification cycle N+1; the work therefore takes place in a closed circuit.

However, it sometimes happens that the heat inputs give rise to a partial vaporization of the liquid nitrogen present in the adsorber, this vaporization being proportionally greater the more distant the cycles N and N+1 are in time. This vaporization of liquid nitrogen to gaseous nitrogen results in an increase in the pressure within the adsorber and, in parallel, a lowering of the level of liquid nitrogen present in the latter. For safety reasons, especially compliance with the maximum pressure rating of the equipment, an at least partial discharge of the gaseous nitrogen formed is carried out, via conventional safety devices known to a person skilled in the art (valves, etc.).

Furthermore, in order to compensate the lowering of the level of liquid nitrogen within the absorber, a topping-up of liquid nitrogen is performed, if necessary, via the conduit for keeping cold 10.

This device also makes it possible to delay as much as possible the adsorbent regeneration stages. In other words, it will be necessary to carry out a regeneration of the adsorbent only after a relatively long period of use (for example several months) or alternately, in the case of purification cycles which are closer together, this regeneration may take place only after purification of large quantities of liquid nitrogen, for example several hundred tons.

Such a regeneration stage will preferably intervene only after a purification of a given quantity of liquid nitrogen. Draining of the reactor 2 will then be carried out, followed by blowing the adsorbent countercurrentwise with the aid, firstly, of nitrogen at ambient temperature (approximately 20°) and then with nitrogen at a temperature of approximately 200°; the nitrogen employed for this purpose originates from the storage tank 3 and is conveyed towards an atmospheric vaporizer 5 via a conduit 12a and then towards a nitrogen reheater 6 via a conduit 12b before being introduced into the reactor via a conduit 12c. The reactivation of the adsorbent 11 is performed with the aid of a hydrogen/nitrogen gas mixture (for example 2% $H_2/N_2$), it being possible for the source of hydrogen 7 to be, for example, one or more bottles containing hydrogen under pressure, which are connected to the conduit 12c through the intermediacy of a conduit 13. The flow rate of hydrogen injected into the nitrogen circulating in the conduit 12c is adjusted, via a control instrument 14, with a view to producing the desired $H_2/N_2$ mixture. After reactivation, the adsorbent is cooled by blowing nitrogen at ambient temperature; cooling of the adsorbent with the aid of liquid nitrogen will be performed only during the cycle of purifications to follow.

The process used here is therefore simple and inexpensive and makes it possible to guarantee high purity liquid nitrogen or any other cryogenic fluid in the high purity liquid state, that is to say containing less than a few ppb (parts per thousand million) of impurities.

The example which follows makes it possible to illustrate the effectiveness of the process and of the device according to the invention.

EXAMPLE

The process according to the invention has been implemented by virtue of a device similar to that described above and applied by way of example to the purification of liquid nitrogen.

The liquid nitrogen to be purified is produced off-site and then conveyed to the purification site by means of a lorry; the source of liquid nitrogen to be purified in this case is therefore, as above, the lorry.

The adsorbent used, for its part, is a Hopcalite which allows a selective removal by adsorption of the oxygen and of the carbon monoxide which are present in the liquid nitrogen to be purified.

After five months of use without a regeneration stage, which corresponds approximately to a purification of about 700 tons of liquid nitrogen, analyses were carried out on samples of purified liquid nitrogen which were taken downstream of the reactor with the aid of specific and conventional analyzers which have detection thresholds at the ppb level. The results obtained show that the high purity liquid nitrogen thus obtained contains quantities of carbon monoxide and oxygen contaminants which are lower than one ppb.

It has been possible to obtain these quite surprising results by systematically keeping the adsorbent cold by means of purified liquid nitrogen during the stages of stoppage of the device between the successive purification cycles, the cycles having been deliberately separated by periods of time longer than or equal to ten days.

The process and the device of the invention can be applied successfully not only to the purification of liquid nitrogen but also to the purification of other cryogenic fluids in the liquid state such as, for example, liquid argon or liquid helium.

I claim:

1. Process for the preparation of a cryogenic fluid in the high purity liquid state, substantially free from at least one of the impurities which it contains, the process comprising:

contacting impure cryogenic fluid in the liquid state with an adsorbent permitting adsorption of at least one of the impurities;

recovering purified cryogenic fluid in the high purity liquid state; and maintaining the adsorbent at a low temperature by cooling at least a portion of the adsorbent with the purified cryogenic fluid in the liquid state for at least a portion of the period of a stoppage stage separating a purification cycle N and a subsequent consecutive purification cycle N+1.

2. Process according to claim 1, wherein the cooling of at least a portion of the adsorbent is carried out by direct contact with the purified cryogenic fluid in the high purity liquid state.

3. Process according to claim 1, wherein the adsorbent is cooled by immersion in the purified cryogenic fluid in the high purity liquid state.

4. Process according to claim 1, wherein the cooling of the adsorbent is maintained substantially throughout the period of the stoppage stage.

5. Process according to claim 1, wherein the adsorbent is selected from the group consisting of natural and synthetic zeolites, optionally exchanged, and porous metal oxides.

6. Process according to claim 5, wherein the adsorbent is zeolite, which is a mordenite or a synthetic zeolite selected from the group consisting of zeolite A, zeolite X, and zeolite Y.

7. Process according to claim 6, wherein the zeolite is a zeolite exchanged with at least a metal ion selected from the group consisting of lithium, calcium, barium, strontium, zinc, iron, silver and copper.

8. Process according to claim 7, wherein the zeolite is exchanged with a copper or silver ion.

9. Process according to claim 8, wherein the zeolite is a zeolite 5A exchanged with a copper or silver ion.

10. Process according to claim 5, wherein the adsorbent is a porous metal oxide which includes at least one oxide of a transition metal.

11. Process according to claim 10, wherein the porous metal oxide includes a mixed copper manganese oxide.

12. Process according to claim 11, wherein the copper manganese oxide is Hopcalite.

13. Process according to claim 1, wherein the cryogenic fluid in the liquid state is selected from the group consisting of liquid helium, liquid argon, and liquid nitrogen.

14. Process according to claim 13, wherein the cryogenic fluid is liquid nitrogen which is purified of at least one impurity selected from the group consisting of hydrogen, carbon monoxide, and oxygen.

15. Apparatus for the preparation of a cryogenic fluid in the high purity liquid state, substantially free from at least one of the impurities which it contains, the apparatus comprising:

a source of impure cryogenic fluid containing impurities;

at least one reactor having an upstream conduit fluidly connected to said source and a downstream conduit, said reactor containing at least one adsorbent for removal of at least one of the impurities;

at least one storage tank fluidly connected to said downstream conduit for storing purified cryogenic fluid in the high purity liquid state;

at least one conduit means for keeping cold, said conduit means supplying a flow of purified cryogenic fluid in the high purity liquid state, to cool at least a portion of the adsorbent bed during at least a portion of the period of a stoppage stage separating a purification cycle N and a subsequent consecutive purification cycle N+1.

16. Apparatus according to claim 15, wherein the conduit means for keeping cold has an upstream end, a downstream end, and is connected by at least one of its upstream or downstream ends to at least one downstream or upstream portion of the downstream conduit.

17. Apparatus according to claim 16, further comprising at least one filter positioned in the downstream conduit between the upstream and downstream ends of the conduit means for keeping cold.

18. Apparatus according to claim 15, wherein the upstream end of the conduit means for keeping cold is connected to at least one source of purified cryogenic fluid in the high purity liquid state, and the downstream end of the conduit means for keeping cold is connected to said at least one reactor.

19. Apparatus according to claim 15, wherein the source of purified cryogenic fluid in the high purity liquid state is in said at least one storage tank.

* * * * *